UNITED STATES PATENT OFFICE.

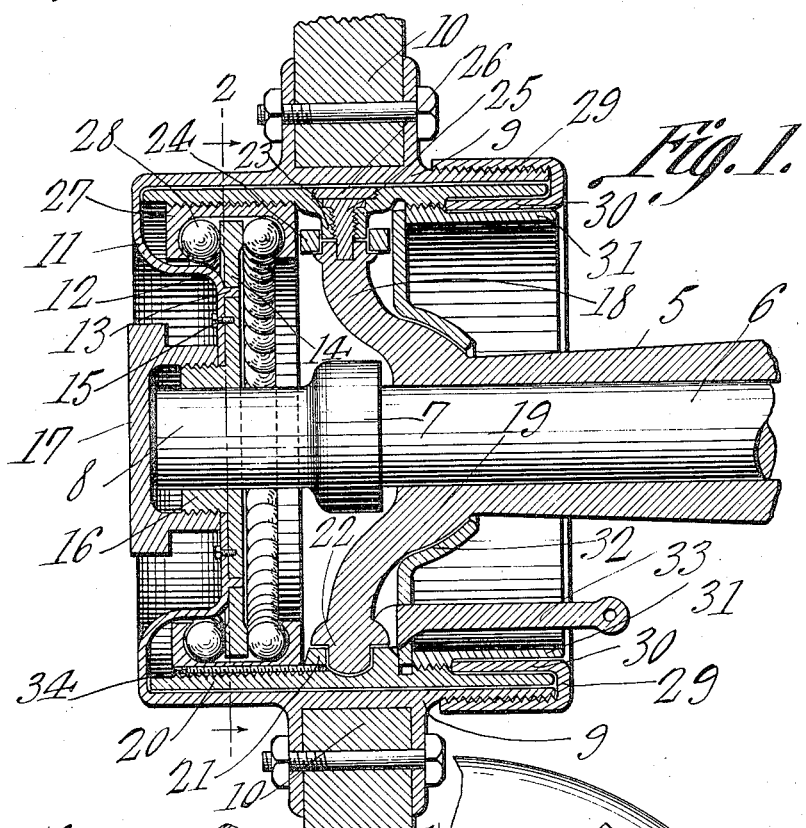

ROLLO ROBIN BELL, OF WICHITA, KANSAS.

FRONT-AXLE DRIVE.

1,017,128. Specification of Letters Patent. Patented Feb. 13, 1912.

Application filed March 13, 1911. Serial No. 614,095.

*To all whom it may concern:*

Be it known that I, ROLLO R. BELL, a citizen of the United States, residing at Wichita, in the county of Sedgwick and State of Kansas, have invented a new and useful Front-Axle Drive, of which the following is a specification.

The present invention aims to provide an improved front axle drive for motor driven vehicles.

The invention aims also to so construct the drive mechanism that turning of the wheels to steer the vehicle will in no way interfere with the transmission of power to the wheels.

The invention further aims to effectually provide against disarrangement of the drive mechanism due to end thrust.

In the accompanying drawings,—Figure 1 is a vertical axial sectional view through the mechanism embodying the present invention. Fig. 2 is a vertical sectional view on the line 2—2 of Fig. 1.

In the drawings, the numeral 5 indicates the front axle of the vehicle and 6 the drive shaft which is rotatably mounted in the axle and has connection, by means of an ordinary universal joint 7, with a stub shaft 8.

The wheel hub is indicated by the numeral 9 and has secured thereto the inner ends of the wheel spokes 10. The hub is in the form of a collar formed at one end with a flange 11 which is struck inwardly as at 12. The portion 12 of the flange carries lugs 13, upon its inner face, which lugs seat in openings in a disk 14, the disk being held to the flange by suitable bolts 15. The disk 14 is formed with an outwardly projecting concentric annular shoulder 16 and the stub shaft 8 projects through the disk and is fixed with respect thereto, a cap 17 being threaded upon the annular shoulder 16 and covering the outer end of the shaft 8. From the foregoing it will be understood that power is applied to the shaft 6 and is transmitted to the stub shaft 8 and from this shaft to the hub 9 of the wheel.

At its end, the axle 5 is formed with an arm 18 and an arm 19, the one 18 projecting upwardly and the one 19 projecting downwardly. A collar 20 is formed with a socket 21 and the extremity of the arm 19 is formed with a stud 22 fitting in this socket. At a diametrically opposite point, the collar is formed with a boss 23 and upon this boss is fitted a collar 24. The extremity of the arm 18 is disposed against the boss 23 and the collar 24 surrounds the boss and the said end of the arm whereby to insure against their lateral displacement. This is primarily prevented, however, by a screw 25 threaded through the boss and having a plane end projecting into the extremity of the arm 18. A disk 26 is threaded into the collar and covers the head of the screw 25, the threads for the screw and for the disk running in opposite directions whereby the disk will act as a lock for the screw. In the manner above described, the collar 20 is supported upon the axle 5 so as to permit of rocking of the former upon the latter about a vertical axis. In a manner to be presently explained, the hub 9 is mounted to rotate upon the collar 20 and consequently, the wheel as an entity is supported at the end of the axle both for rotation and for turning movement about a vertical axis.

A ball race 27 is threaded into the collar 20 and fitted therein are two series of bearing balls 28 between which series the peripheral portion of the disk 14 projects. The disk being held for rotation between the two series of bearing balls, is prevented from lateral movement in either direction, and consequently, end thrust cannot act to disarrange the mechanism. A cap 29 is threaded upon the hub 9 at the inner end thereof and has a flange 30 between which and the body of the collar are received the inner ends of the hub 9 and the collar 20 as clearly shown in Fig. 1 of the drawing. A collar 31 is threaded into the collar 20 and overlaps the flange 30 of the cap collar. Also, the collar 31 serves to hold in place a cap 32 which is fitted upon the end of the axle 5 and prevents entrance of dust and dirt into the interior of the collar 20. The cap 32 is formed with an opening and an arm 33 is fitted loosely through the opening and has diverging fingers which are secured to the member 20 at opposite sides of the pivot 22. As a means for holding the bearing member 27 against backward rotation, a small screw 34 is threaded through this member and projects at its end into the seat 21 as clearly shown in Fig. 1 of the drawings.

What is claimed is:—

1. In drive mechanism of the class described, an axle, a collar formed interiorly with a socket and at its diametrically opposite point with a boss, the axle having an arm fitting at its end in the socket and having an arm disposed at its ends in juxtaposition to the boss, a screw threaded through the boss and having a portion projecting into the end of the last mentioned arm, a ball race held within the collar, a series of bearing balls in the race, a hub rotatably fitted upon the collar, a disk held for rotation with the hub and projecting at its peripheral portion between the series of bearing balls, and a drive shaft fixed for rotation with the disk.

2. In drive mechanism of the class described, an axle, a collar supported at the end of the axle for turning movement about a vertical axis, a hub rotatably fitted upon the collar, a cap collar removably fitted upon the hub and receiving one end of the first mentioned collar, the hub at its other end having a flange, a disk removably secured to the flange, a ball race held within the first mentioned collar, a series of bearing balls in the race, the disk projecting at its peripheral portion between the series of bearing balls, and a drive shaft fixed with relation to the disk.

In testimony that I claim the foregoing as my own, I have hereto affixed my signature in the presence of two witnesses.

ROLLO ROBIN BELL.

Witnesses:
 WALTER T. MATSON,
 PAUL J. WALL.